United States Patent
Kim et al.

(10) Patent No.: US 10,699,661 B2
(45) Date of Patent: Jun. 30, 2020

(54) DISPLAY PANEL AND A DISPLAY APPARATUS HAVING THE SAME WITH MODIFIED SHIELD ELECTRODE

(71) Applicant: SAMSUNG DISPLAY CO., LTD., Yongin-si, Gyeonggi-Do (KR)

(72) Inventors: Daecheol Kim, Hwaseong-si (KR); Jin-Ho Oh, Suwon-si (KR); Kyungwon Park, Seongnam-si (KR); Hyosuk Park, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 27 days.

(21) Appl. No.: 15/599,099

(22) Filed: May 18, 2017

(65) Prior Publication Data

US 2017/0337892 A1    Nov. 23, 2017

(30) Foreign Application Priority Data

May 20, 2016  (KR) .................. 10-2016-0062410

(51) Int. Cl.
```
G09G 3/36      (2006.01)
G02F 1/1343    (2006.01)
G02F 1/1362    (2006.01)
G02F 1/1337    (2006.01)
G02F 1/1333    (2006.01)
```

(52) U.S. Cl.
CPC ..... *G09G 3/3696* (2013.01); *G02F 1/134336* (2013.01); *G02F 1/136286* (2013.01); *G09G 3/3655* (2013.01); *G09G 3/3677* (2013.01); *G09G 3/3688* (2013.01); *G02F 1/1337* (2013.01); *G02F 2001/133397* (2013.01); *G02F 2001/136218* (2013.01); *G02F 2201/121* (2013.01); *G02F 2201/123* (2013.01); *G09G 2300/0426* (2013.01); *G09G 2310/08* (2013.01); *G09G 2320/0204* (2013.01); *G09G 2320/0257* (2013.01); *G09G 2320/0673* (2013.01)

(58) Field of Classification Search
CPC .................................................... G09G 3/3688
See application file for complete search history.

(56) References Cited

U.S. PATENT DOCUMENTS

```
   8,035,598 B2   10/2011  Liao et al.
2010/0315569 A1* 12/2010  Lin ................... G02F 1/136209
                                                          349/43
2011/0051055 A1*  3/2011  Lee ....................... G02F 1/1323
                                                         349/106
2015/0077393 A1*  3/2015  Kawachi ................ G06F 3/044
                                                         345/174
```

FOREIGN PATENT DOCUMENTS

KR    1020110087584    8/2011

* cited by examiner

*Primary Examiner* — Gustavo Polo
(74) *Attorney, Agent, or Firm* — F. Chau & Associates, LLC

(57) ABSTRACT

A display panel includes a first substrate and a second substrate. The first substrate includes a plurality of pixel electrodes to which pixel voltages are applied and a shield electrode disposed between the pixel electrodes. A shield voltage is applied to the shield electrode. The second substrate faces the first substrate. The second substrate includes a common electrode to which a common voltage is applied.

18 Claims, 5 Drawing Sheets

DISPLAY PANEL AND A DISPLAY APPARATUS HAVING THE SAME WITH MODIFIED SHIELD ELECTRODE

CROSS-REFERENCE TO RELATED APPLICATION

This application claims priority under 35 U.S.C. § 119 to Korean Patent Application No. 10-2016-0062410, filed on May 20, 2016 in the Korean Intellectual Property Office (KIPO), the disclosure of which is incorporated by reference herein in its entirety.

TECHNICAL FIELD

Exemplary embodiments of the present inventive concept relate to a display panel and a display apparatus including the display panel. More particularly, exemplary embodiments of the present inventive concept relate to a display panel with increased display quality and a display apparatus including the display panel.

DISCUSSION OF RELATED ART

A display apparatus includes a display panel and a display panel driver. The display panel driver includes a timing controller, a gate driver, and a data driver. The timing controller controls driving timings of the gate driver and the data driver. The gate driver outputs a gate signal to a gate line. The data driver outputs a data voltage to a data line.

When the display panel displays a specific pattern for a long time, an afterimage may be generated due to a residual direct current (DC) component. When impurities in a liquid crystal layer are absorbed in an alignment layer, the residual DC component may be generated due to the impurities. For example, when the display panel displays an image including a black pattern and a white pattern together, the impurities in the black pattern may be collected at a boundary portion of the black pattern and the white pattern, resulting in a line afterimage generated at the boundary portion of the black pattern and the white pattern.

SUMMARY

According to an exemplary embodiment of the present inventive concept, a display panel includes a first substrate and a second substrate. The first substrate includes a plurality of pixel electrodes and a shield electrode disposed between the pixel electrodes. The second substrate faces the first substrate and includes a common electrode. The plurality of pixel electrodes is configured to receive pixel voltages. The shield electrode is configured to receive a shield voltage. The common electrode is configured to receive a common voltage.

In an exemplary embodiment of the present inventive concept, the shield voltage may not be equal to the common voltage.

In an exemplary embodiment of the present inventive concept, the common voltage and the shield voltage may be direct current voltages.

In an exemplary embodiment of the present inventive concept, a first black voltage is a black grayscale voltage of a positive polarity, a second black voltage is a black grayscale voltage of a negative polarity, and a black gap (BG) is a difference between the first black voltage and the second black voltage. An absolute value of a difference between the common voltage and the shield voltage may be greater than or equal to BG/2.

In an exemplary embodiment of the present inventive concept, the common voltage may be greater than the shield voltage.

In an exemplary embodiment of the present inventive concept, the shield electrode and the plurality of pixel electrodes may be disposed on a same layer.

In an exemplary embodiment of the present inventive concept, the shield electrode and the plurality of pixel electrodes may be formed by the same metal layer.

In an exemplary embodiment of the present inventive concept, the shield electrode may include a first extending portion extending in a first direction, a second extending portion extending in a second direction crossing the first direction, and a crossing portion at which the first extending portion and the second extending portion cross.

In an exemplary embodiment of the present inventive concept, the first substrate may include a gate line extending in the first direction and a data line extending in the second direction. The first extending portion of the shield electrode may overlap the gate line.

In an exemplary embodiment of the present inventive concept, the first substrate may include a gate line extending in the first direction and a data line extending in the second direction. The second extending portion of the shield electrode may overlap the data line.

According to an exemplary embodiment of the present inventive concept, a display apparatus includes a display panel, a gate driver, a data driver, and a common voltage generator. The display panel includes a first substrate and a second substrate facing the first substrate. The first substrate includes a plurality of pixel electrodes and a shield electrode disposed between the pixel electrodes. The second substrate includes a common electrode. The gate driver is configured to provide a gate signal to the display panel. The data driver is configured to provide a data voltage to the display panel and apply pixel voltages to the plurality of pixel electrodes. The common voltage generator is configured to apply a common voltage to the common electrode and a shield voltage to the shield electrode.

In an exemplary embodiment of the present inventive concept, the common voltage may not be equal to the shield voltage.

In an exemplary embodiment of the present inventive concept, the common voltage and the shield voltage may be direct current voltages.

In an exemplary embodiment of the present inventive concept, a first black voltage is a black grayscale voltage of a positive polarity, a second black voltage is a black grayscale voltage of a negative polarity, and a black gap (BG) is a difference between the first black voltage and the second black voltage. An absolute value of a difference between the common voltage and the shield voltage may be greater than or equal to BG/2.

In an exemplary embodiment of the present inventive concept, the shield electrode and the plurality of pixel electrodes may be disposed on a same layer.

In an exemplary embodiment of the present inventive concept, the shield electrode may include a first extending portion extending in a first direction, a second extending portion extending in a second direction crossing the first direction, and a crossing portion at which the first extending portion and the second extending portion cross.

In an exemplary embodiment of the present inventive concept, the first substrate may include a gate line extending in the first direction and a data line extending in the second direction. The first extending portion of the shield electrode may overlap the gate line.

In an exemplary embodiment of the present inventive concept, the first substrate may include a gate line extending in the first direction and a data line extending in the second direction. The second extending portion of the shield electrode may overlap the data line.

According to an exemplary embodiment of the present inventive concept, in a method of operating a display panel including a first substrate and a second substrate, the first substrate includes plurality of pixel electrodes and a shield electrode disposed between each of the plurality of pixel electrodes, and the second substrate includes a common electrode. The method includes applying a shield voltage to the shield electrode, and applying a common voltage different from the shield voltage to the common electrode. A first black voltage is a black grayscale voltage of a positive polarity, a second black voltage is a black grayscale voltage of a negative polarity, and a black gap (BG) is a difference between the first black voltage and the second black voltage. An absolute value of a difference between the common voltage and the shield voltage is greater than or equal to BG/2.

In an exemplary embodiment of the present inventive concept, a plurality of pixel voltages is applied to the plurality of pixel electrodes. The pixel voltages alternate between a positive polarity with respect to the common voltage and a negative polarity with respect to the common voltage when applied to the pixel electrodes in a first direction. The pixel voltages alternate between the positive polarity and the negative polarity when applied to the pixel electrodes in a second direction that is substantially perpendicular to the first direction.

BRIEF DESCRIPTION OF THE DRAWINGS

The above and other features of the present inventive concept will become more apparent by describing in detail exemplary embodiments thereof with reference to the accompanying drawings.

DETAILED DESCRIPTION OF THE EMBODIMENTS

Figure 1:
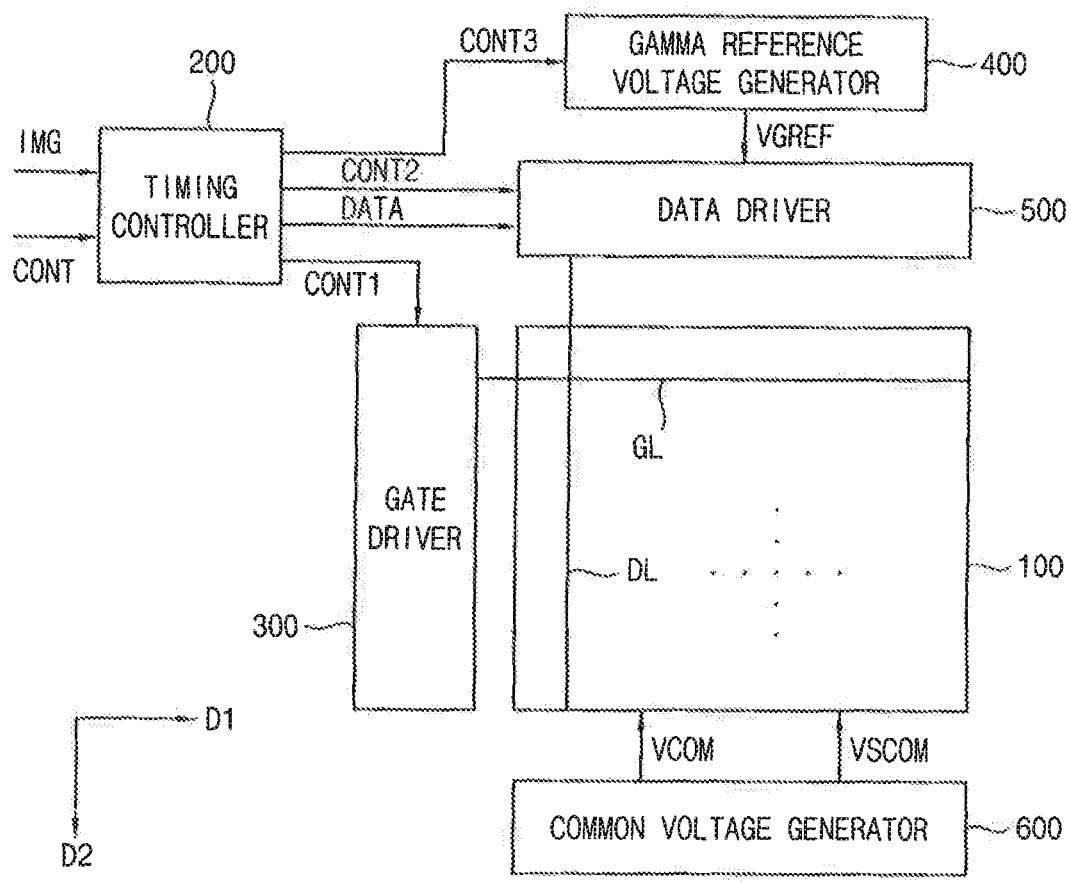
FIG. 1 is a block diagram illustrating a display apparatus according to an exemplary embodiment of the present inventive concept.

Exemplary embodiments of the present inventive concept will be explained in detail hereinafter with reference to the accompanying drawings. Like reference numerals may refer to like elements throughout this application.

Exemplary embodiments of the present inventive concept provide a display panel capable of preventing a line afterimage and increasing display quality by applying a shield voltage to a shield electrode disposed between pixel electrodes.

Exemplary embodiments of the present inventive concept also provide a display apparatus including the above-mentioned display panel.

FIG. 1 is a block diagram illustrating a display apparatus according to an exemplary embodiment of the present inventive concept.

Referring to FIG. 1, the display apparatus includes a display panel 100 and a display panel driver. The display panel driver includes a timing controller 200, a gate driver 300, a gamma reference voltage generator 400, a data driver 500, and a common voltage generator 600.

The display panel 100 has a display region on which an image is displayed and a peripheral region adjacent to the display region.

The display panel 100 includes a plurality of gate lines GL, a plurality of data lines DL, and a plurality of pixels electrically connected to the gate lines GL and the data lines DL. The gate lines GL extend in a first direction D1 and the data lines DL extend in a second direction D2 crossing (e.g., substantially perpendicular to) the first direction D1.

Each pixel includes a switching element and a pixel electrode. The pixel electrode is electrically connected to the switching element. The pixels may be disposed in a matrix form.

The display panel 100 may include a first substrate and a second substrate facing the first substrate. The first substrate may include the pixel electrode and a shield electrode. The second substrate may include a common electrode. The display panel 100 may further include a liquid crystal layer disposed between the first substrate and the second substrate. For example, a first alignment layer may be formed on the first substrate. For example, a second alignment layer may be formed on the second substrate.

A structure of the display panel 100 will be explained in detail below with reference to FIGS. 3 to 9.

The timing controller 200 receives input image data IMG and an input control signal CONT from an external apparatus. The input image data IMG may include red image data, green image data, and blue image data. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3, and a data signal DATA based on the input image data IMG and the input control signal CONT.

The timing controller 200 generates the first control signal CONT1, for controlling an operation of the gate driver 300, based on the input control signal CONT, and outputs the first control signal CONT1 to the gate driver 300. The first control signal CONT1 may further include a vertical start signal and a gate clock signal.

The timing controller 200 generates the second control signal CONT2, for controlling an operation of the data driver 500, based on the input control signal CONT, and outputs the second control signal CONT2 to the data driver 500. The second control signal CONT2 may include a horizontal start signal and a load signal.

The timing controller 200 generates the data signal DATA based on the input image data IMG. The timing controller 200 outputs the data signal DATA to the data driver 500.

The timing controller 200 generates the third control signal CONT3, for controlling an operation of the gamma reference voltage generator 400, based on the input control signal CONT, and outputs the third control signal CONT3 to the gamma reference voltage generator 400.

The gate driver 300 generates gate signals for driving the gate lines GL in response to the first control signal CONT1 received from the timing controller 200. The gate driver 300 may sequentially output the gate signals to the gate lines GL.

The gate driver 300 may be directly mounted on the display panel 100, or may be connected to the display panel 100 as a tape carrier package (TCP) type. Alternatively, the gate driver 300 may be integrated on the display panel 100.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level of the data signal DATA.

In an exemplary embodiment of the present inventive concept, the gamma reference voltage generator 400 may be disposed in the timing controller 200 or in the data driver 500.

The data driver 500 receives the second control signal CONT2 and the data signal DATA from the timing controller 200, and receives the gamma reference voltage VGREF from the gamma reference voltage generator 400. The data driver 500 converts the data signal DATA into data voltages having an analog type using the gamma reference voltage VGREF. The data driver 500 outputs the data voltages to the data lines DL. The data driver 500 may be configured to apply a pixel voltage to the pixel electrode of each of the plurality of pixels.

The data driver 500 may be directly mounted on the display panel 100, or may be connected to the display panel 100 as a TCP type. Alternatively, the data driver 500 may be integrated on the display panel 100.

The common voltage generator 600 generates a common voltage VCOM and outputs the common voltage VCOM to the display panel 100. The common voltage generator 600 also generates a shield voltage VSCOM and outputs the shield voltage VSCOM to the display panel 100. The common voltage VCOM may be a direct current ("DC") voltage. The shield voltage VSCOM may also be a DC voltage. The common voltage VCOM may be applied to the common electrode of the display panel 100. The shield voltage VSCOM may be applied to the shield electrode of the display panel 100. For example, the common voltage generator 600 may change a level of the common voltage VCOM to generate the shield voltage VSCOM. The common voltage generator 600 may include a level adjust resistor to change the level of the common voltage VCOM to generate the shield voltage VSCOM.

Figure 2:
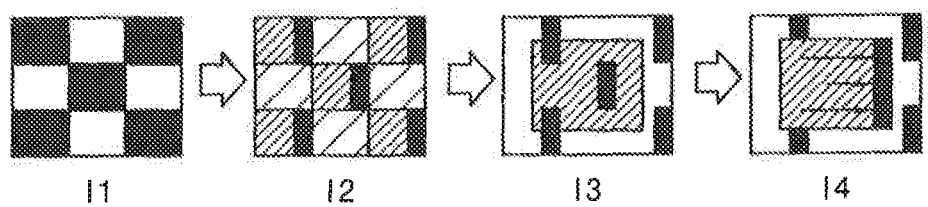
FIG. 2 is a diagram illustrating a line afterimage generated on a display panel of FIG. 1.

FIG. 2 is a diagram illustrating a line afterimage generated on a display panel of FIG. 1.

Hereinafter, a case in which a line afterimage is generated is explained with reference to FIGS. 1 and 2. When manufacturing the display panel 100, the display panel 100 may have kickback voltages that vary according to a position in the display panel 100 due to process variation. For example, gate-source capacitances of switching elements of the pixels may vary according to the position in the display panel 100 due to the process variation. Accordingly, the kickback voltages may vary according to the position in the display panel 100.

For example, when the kickback voltage gradually increases along a direction of the display panel 100, impurities may move along that direction of the display panel 100. For example, when the kickback voltage gradually increases from a left side of the display panel 100 to a right side of the display panel 100, the pixel voltage for the same grayscale value gradually decreases from the left side of the display panel 100 to the right side of the display panel 100. When the impurities have a positive polarity, the impurities may move from the left side of the display panel 100 to the right side of the display panel 100. In contrast, when the impurities have a negative polarity, the impurities may move from the right side of the display panel 100 to the left side of the display panel 100.

For example, when the display panel 100 displays a white pattern, the pixel voltage for the white grayscale is relatively high so that the impurities may not move in a specific direction despite the process variation. In contrast, when the display panel 100 displays a black pattern, the pixel voltage for the black grayscale is close to the common voltage VCOM so that the impurities may be likely to move in a specific direction due to the process variation.

For example, the display panel 100 displays a first image I1 including a black rectangular pattern and a white rectangular pattern for a specific duration. When the kickback voltage increases from the left side of the display panel 100 to the right side of the display panel 100 and the impurities have the positive polarity, the impurities in an area of the black pattern moves toward a boundary portion of the black rectangular pattern and the white rectangular pattern in a direction from the left side to the right side of the display panel 100.

When the display panel 100 displays a second image I2 including a gray pattern having a 25% grayscale level which overlaps an entire area of the display panel 100, a luminance of an area corresponding to the black rectangular pattern of the first image I1 is less than a luminance of an area corresponding to the white rectangular pattern of the first image I1 due to a surface afterimage of the display panel 100. In addition, a strong line afterimage is generated at the boundary portion of the black rectangular pattern and the white rectangular pattern.

When the display panel 100 displays a third image I3 including a gray box pattern having a 25% grayscale level which overlaps a central area of the display panel 100, the impurities in the gray box pattern moves relatively quickly to a boundary portion of the gray box pattern and a white area. In other words, the strong line afterimage of the second image I2 overlapping with the gray box pattern may move to the boundary portion of the gray box pattern and the white area.

When the third image 13 is displayed on the display panel 100 for a long time, a fourth image 14 which includes the line afterimage of the third image 13 may be shown to a user. Accordingly, the line afterimage may deteriorate the display quality of the display panel 100.

Figure 3:
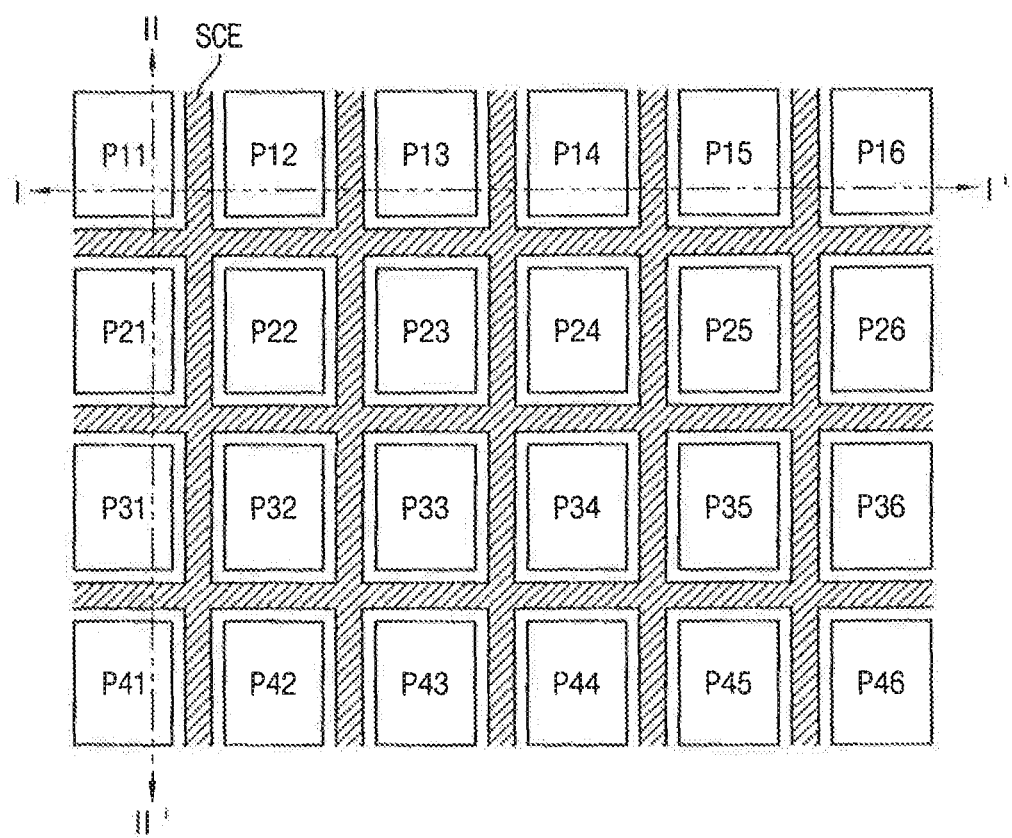
FIG. 3 is a plan view illustrating a first substrate of the display panel of FIG. 1 according to an exemplary embodiment of the present inventive concept.
Figure 4:
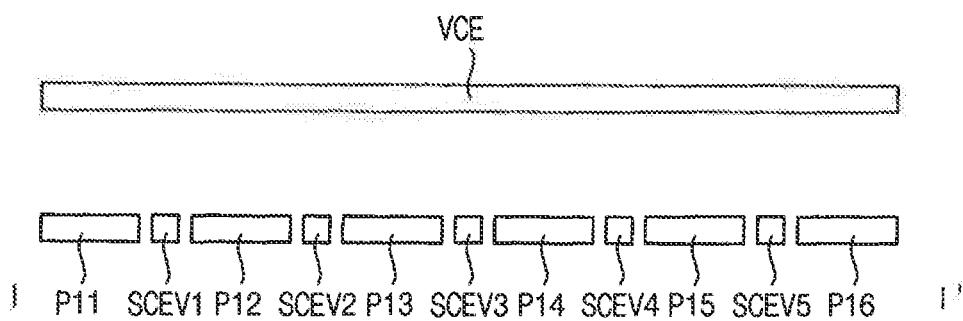
FIG. 4 is a cross-sectional view illustrating the display panel of FIG. 1 along a line I-I' of FIG. 3 according to an exemplary embodiment of the present inventive concept.
Figure 5:
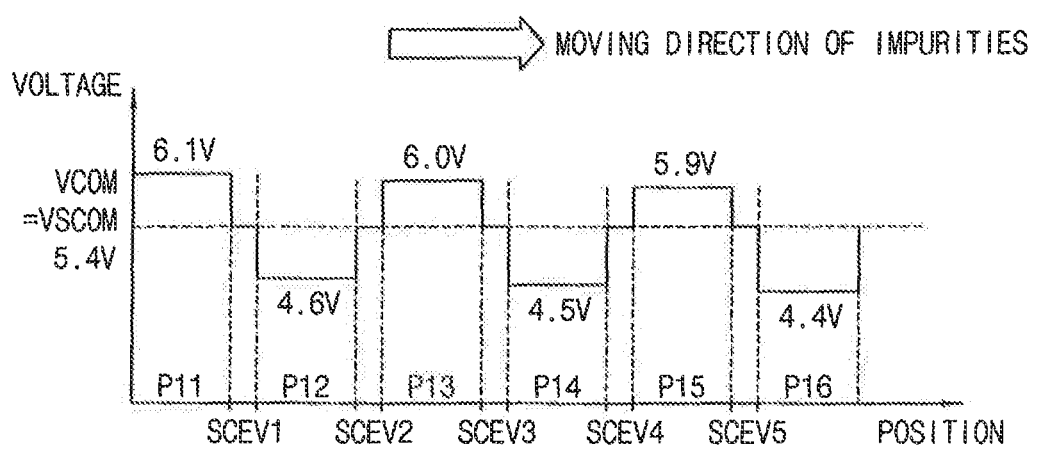
FIG. 5 is a diagram illustrating movement of impurities when pixels of the display panel of FIG. 1 that are disposed in a first direction represent a black grayscale and a shield voltage is equal to a common voltage.
Figure 6:
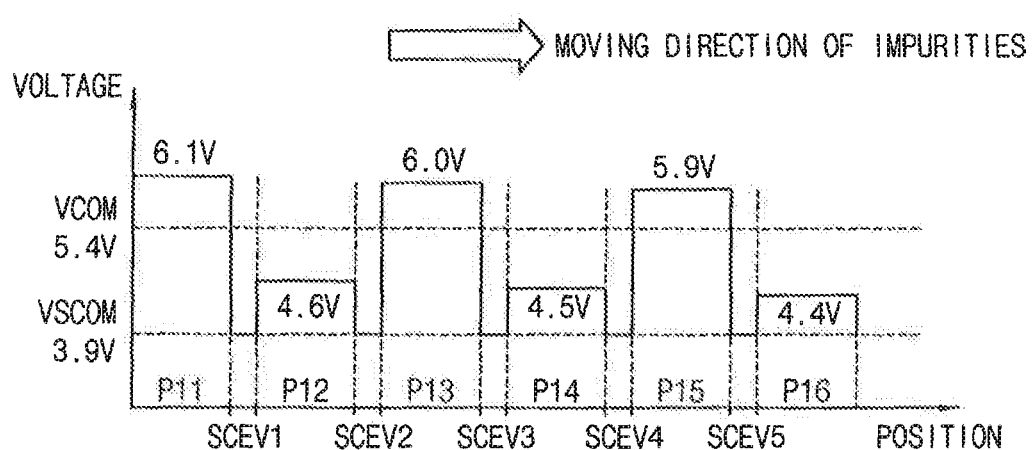
FIG. 6 is a diagram illustrating movement of impurities when the pixels of the display panel of FIG. 1 that are disposed in the first direction represent the black grayscale and the shield voltage is not equal to the common voltage according to an exemplary embodiment of the present inventive concept.

FIG. 3 is a plan view illustrating a first substrate of the display panel of FIG. 1 according to an exemplary embodiment of the present inventive concept. FIG. 4 is a cross-sectional view illustrating the display panel of FIG. 1 along a line I-I' of FIG. 3 according to an exemplary embodiment of the present inventive concept. FIG. 5 is a diagram illustrating movement of impurities when pixels of the display panel of FIG. 1 that are disposed in a first direction represent a black grayscale and a shield voltage is equal to a common voltage. FIG. 6 is a diagram illustrating movement of impurities when the pixels of the display panel of FIG. 1 that are disposed in the first direction represent the black grayscale and the shield voltage is not equal to the common voltage according to an exemplary embodiment of the present inventive concept.

Referring to FIGS. 1 to 3, as described above, the display panel 100 includes the first substrate and the second substrate.

The first substrate includes pixel electrodes P11 to P46 and a shield electrode SCE disposed between the pixel electrodes P11 to P46. The shield voltage VSCOM is applied to the shield electrode SCE.

The second substrate faces the first substrate. The second substrate includes a common electrode VCE to which the common voltage VCOM is applied.

For example, the display panel 100 includes a plurality of pixel rows and a plurality of pixel columns. The plurality of pixel rows may include first to fourth pixel rows and the plurality of pixel columns may include first to sixth pixel columns.

The first pixel row includes a first pixel electrode P11, a second pixel electrode P12, a third pixel electrode P13, a fourth pixel electrode P14, a fifth pixel electrode P15, and a sixth pixel electrode P16 disposed along the first direction D1. The second pixel row includes a seventh pixel electrode P21, an eighth pixel electrode P22, a ninth pixel electrode P23, a tenth pixel electrode P24, an eleventh pixel electrode P25, and a twelfth pixel electrode P26 disposed along the first direction D1. The third pixel row includes a thirteenth pixel electrode P31, a fourteenth pixel electrode P32, a fifteenth pixel electrode P33, a sixteenth pixel electrode P34, a seventeenth pixel electrode P35, and an eighteenth pixel electrode P36 disposed along the first direction D1. The fourth pixel row includes a nineteenth pixel electrode P41, a twentieth pixel electrode P42, a twenty-first pixel electrode P43, a twenty-second pixel electrode P44, a twenty-third pixel electrode P45, and a twenty-fourth pixel electrode P46 disposed along the first direction D1.

The first pixel column includes the first pixel electrode P11, the seventh pixel electrode P21, the thirteenth pixel electrode P31, and the nineteenth pixel electrode P41 disposed along the second direction D2. The second pixel column includes the second pixel electrode P12, the eighth pixel electrode P22, the fourteenth pixel electrode P32, and the twentieth pixel electrode P42 disposed along the second direction D2. The third pixel column includes the third pixel electrode P13, the ninth pixel electrode P23, the fifteenth pixel electrode P33, and the twenty-first pixel electrode P43 disposed along the second direction D2. The fourth pixel column includes the fourth pixel electrode P14, the tenth pixel electrode P24, the sixteenth pixel electrode P34, and the twenty-second pixel electrode P44 disposed along the second direction D2. The fifth pixel column includes the fifth pixel electrode P15, the eleventh pixel electrode P25, the seventeenth pixel electrode P35, and the twenty-third pixel electrode P45 disposed along the second direction D2. The sixth pixel column includes the sixth pixel electrode P16, the twelfth pixel electrode P26, the eighteenth pixel electrode P36, and the twenty-fourth pixel electrode P46 disposed along the second direction D2.

The shield electrode SCE may include a first extending portion extending in the first direction D1, a second extending portion extending in the second direction D2, and a crossing portion at which the first extending portion and the second extending portion cross or intersect.

The first extending portion of the shield electrode SCE may overlap the gate lines GL. The first extending portion of the shield electrode SCE may block light leakage due to coupling between the gate lines GL and the pixel electrodes P11 to P46. The first extending portion of the shield electrode SCE may block light leakage due to coupling between the gate lines GL and the common electrode VCE.

The second extending portion of the shield electrode SCE may overlap the data lines DL. The second extending portion of the shield electrode SCE may block light leakage due to coupling between the data lines DL and the pixel electrodes P11 to P46. The second extending portion of the shield electrode SCE may block light leakage due to coupling between the data lines DL and the common electrode VCE.

Referring to FIG. 4, the first pixel electrode P11 and the second pixel electrode P12 disposed along the first direction D1 are spaced apart from each other. A first shield electrode portion SCEV1 of the shield electrode SCE is disposed between the first pixel electrode P11 and the second pixel electrode P12. The first shield electrode portion SCEV1 may be spaced apart from the first pixel electrode P11. The first shield electrode portion SCEV1 may be spaced apart from the second pixel electrode P12.

The second pixel electrode P12 and the third pixel electrode P13 disposed along the first direction D1 are spaced apart from each other. A second shield electrode portion SCEV2 of the shield electrode SCE is disposed between the second pixel electrode P12 and the third pixel electrode P13. The second shield electrode portion SCEV2 may be spaced apart from the second pixel electrode P12. The second shield electrode portion SCEV2 may be spaced apart from the third pixel electrode P13. The second shield electrode portion SCEV2 may be connected to the first shield electrode portion SCEV1 as shown in FIG. 3.

A configuration of third to fifth shield electrode portions SCEV3 to SCEV5 of the shield electrode SCE with respect to the third to sixth pixel electrodes P13 to P16 may be substantially the same as that described above regarding the first and second shield electrode portions SCEV1 and SCEV2 with respect to the first to third pixel electrodes P11 to P13.

As shown in FIG. 4, the shield electrode SCE and the pixel electrodes P11 to P46 may be disposed on the same layer. For example, the shield electrode SCE and the pixel electrodes P11 to P46 may be formed from the same metal layer. Thus, the shield electrode SCE and the pixel electrodes P11 to P46 may have substantially the same material. The shield electrode SCE and the pixel electrodes P11 to P46 may be formed by substantially the same patterning process.

FIG. 5 represents an example in which the common voltage VCOM applied to the common electrode VCE is equal to the shield voltage VSCOM applied to the shield electrode SCE. In FIG. 5, the kickback voltage may increase from the first pixel electrode P11 to the sixth pixel electrode P16. In addition, in FIG. 5, the first pixel electrode P11, the third pixel electrode P13, and the fifth pixel electrode P15 may have pixel voltages of the positive polarity, and the second pixel electrode P12, the fourth pixel electrode P14, and the sixth pixel electrode P16 may have pixel voltages of the negative polarity. The first to sixth pixel electrodes P11 to P16 may represent a black image. In addition, the moving direction of the impurities may be from the first pixel P11 to the sixth pixel P16 along the first direction D1. For example, the impurities may have the positive polarity.

In FIG. 5, the common voltage VCOM may be about 5.4V and the shield voltage VSCOM may be about 5.4V, substantially equal to the common voltage VCOM. A first black voltage which is an ideal black grayscale voltage in the positive polarity may be about 6.1V. A second black voltage which is an ideal black grayscale voltage in the negative polarity may be about 4.6V. A black gap BG, which may be the difference between the first black voltage and the second black voltage, may be about 1.5V.

In FIG. 5, when the first to sixth pixel electrodes P11 to P16 represent the black image, for the first pixel electrode P11, the third pixel electrode P13, and the fifth pixel electrode P15 that have the positive polarity with respect to the common voltage VCOM, the pixel voltages decrease as the kickback voltage increases, and thus, the impurities in an area of the first pixel electrode P11 move quickly toward an area of the fifth pixel electrode P15.

In addition, when the first to sixth pixel electrodes P11 to P16 represent the black image, for the second pixel electrode P12, the fourth pixel electrode P14, and the sixth pixel electrode P16 that have the negative polarity with respect to the common voltage VCOM, the pixel voltages decrease as the kickback voltage increases, and thus, the impurities in an area of the second pixel electrode P12 move quickly toward an area of the sixth pixel electrode P16. The impurities may move to a pixel area disposed at the boundary portion of the black pattern and the white pattern.

Referring to FIG. 6, according to the present exemplary embodiment, the shield voltage VSCOM applied to the shield electrode SCE is not equal to the common voltage VCOM. As described above, the common voltage VCOM may be a DC voltage, and the shield voltage VSCOM may be a DC voltage.

When the black gap BG (e.g., 1.5V) is the difference between the first black voltage, which is an ideal black grayscale voltage in the positive polarity (e.g., 6.1V), and the second black voltage, which is an ideal black grayscale voltage in the negative polarity (e.g., 4.6V), an absolute value of the difference between the common voltage VCOM and the shield voltage VSCOM may be greater than or equal to half of the black gap BG (e.g., BG/2=0.75V). In FIG. 6, the absolute value of the difference between the common voltage VCOM and the shield voltage VSCOM is set to 1.5V (e.g., 5.4V−3.9V).

For example, the shield voltage VSCOM may be greater than the common voltage VCOM by BG/2 or more. Alternatively, the shield voltage VSCOM may be less than the common voltage VCOM by BG/2 or more.

For example, when the impurities have the negative polarity, the shield voltage VSCOM may be set to be greater than the common voltage VCOM. When the impurities have the positive polarity, the shield voltage VSCOM may be set to be less than the common voltage VCOM.

In the present exemplary embodiment, the shield voltage VSCOM may be less than or equal to VCOM−BG/2. For example, in this case, BG/2 may be about 0.75V. As shown in FIG. 6, the shield voltage VSCOM is less than the common voltage VCOM by about 1.5V.

In FIG. 6, when the first to sixth pixel electrodes P11 to P16 represent the black image, for the first pixel electrode P11, the third pixel electrode P13, and the fifth pixel electrode P15 that have the positive polarity with respect to the common voltage VCOM, the pixel voltages decrease as the kickback voltage increases. However, the impurities in an area of the first pixel electrode P11 are trapped at the shield electrode SCEV1 disposed between the first pixel electrode P11 and the second pixel electrode P12, the impurities in an area of the third pixel electrode P13 are trapped at the shield electrode SCEV3 disposed between the third pixel electrode P13 and the fourth pixel electrode P14, and the impurities in an area of the fifth pixel electrode P15 are trapped at the shield electrode SCEV5 disposed between the fifth pixel electrode P15 and the sixth pixel electrode P16.

In addition, when the first to sixth pixel electrodes P11 to P16 represent the black image, for the second pixel electrode P12, the fourth pixel electrode P14, and the sixth pixel electrode P16 that have the negative polarity with respect to the common voltage VCOM, the pixel voltages decrease as the kickback voltage increases. However, the impurities in an area of the second pixel electrode P12 are trapped at the shield electrode SCEV1 disposed between the first pixel electrode P11 and the second pixel electrode P12 or at the shield electrode SCEV2 disposed between the second pixel electrode P12 and the third pixel electrode P13. The impurities in an area of the fourth pixel electrode P14 are trapped at the shield electrode SCEV3 disposed between the third pixel electrode P13 and the fourth pixel electrode P14 or at the shield electrode SCEV4 disposed between the fourth pixel electrode P14 and the fifth pixel electrode P15.

Thus, the line afterimage generated due to the impurities collected at the boundary portion of the black pattern and the white pattern may be prevented.

According to the present exemplary embodiment, the line afterimage generated due to the impurities moving along the first direction D1 may be prevented by the shield electrode SCE disposed between the pixel electrodes (e.g., the first to sixth pixel electrodes P11 to P16) disposed along the first direction D1. Thus, the display quality of the display panel 100 may be increased.

Figure 7:
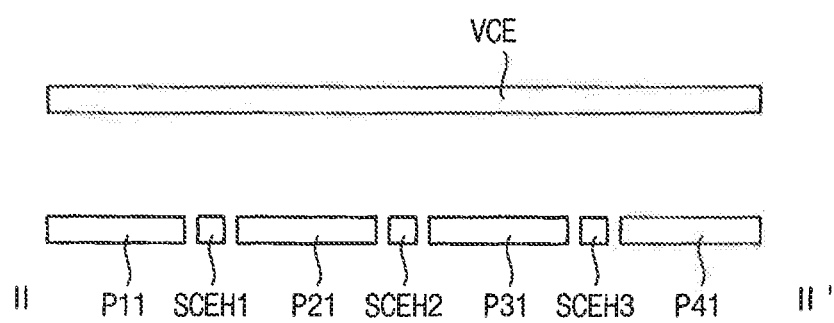
FIG. 7 is a cross-sectional view illustrating the display panel of FIG. 1 along a line II-II' of FIG. 3 according to an exemplary embodiment of the present inventive concept.
Figure 8:
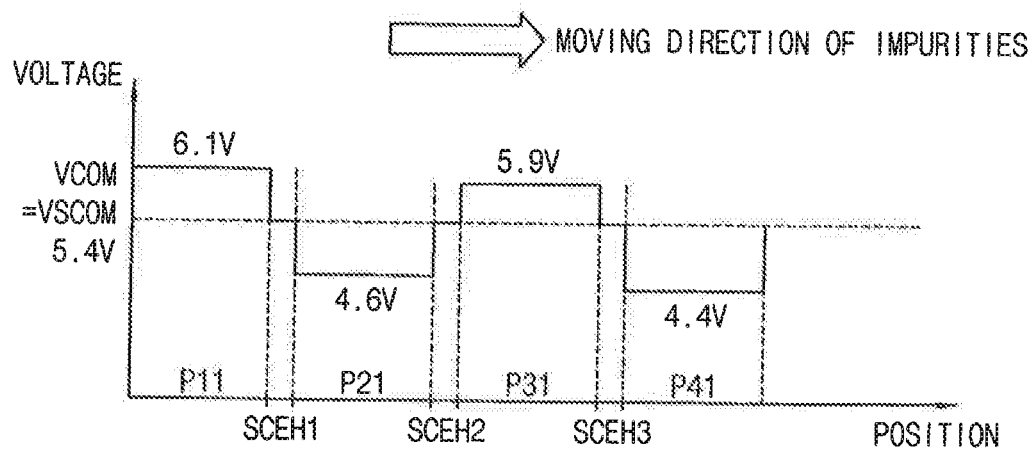
FIG. 8 is a diagram illustrating movement of impurities when pixels of the display panel of FIG. 1 that are disposed in a second direction represent the black grayscale and the shield voltage is equal to the common voltage.
Figure 9:
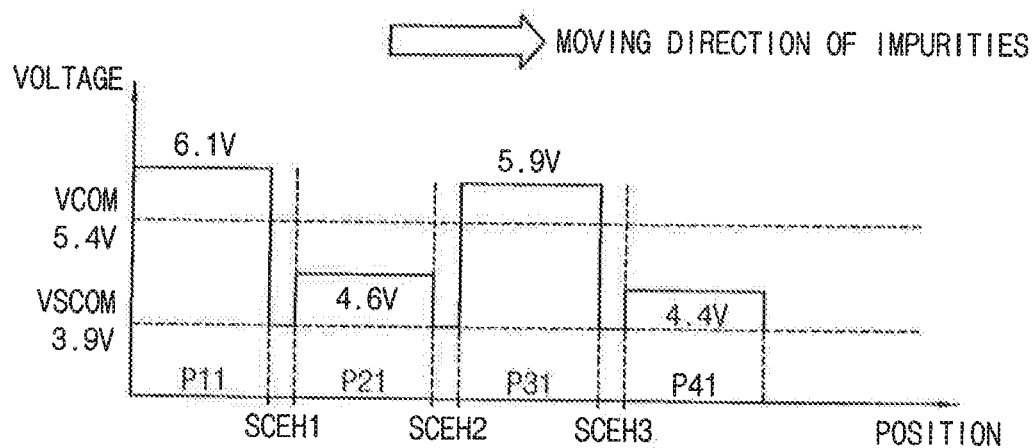
FIG. 9 is a diagram illustrating movement of impurities when the pixels of the display panel of FIG. 1 that are disposed in the second direction represent the black grayscale and the shield voltage is not equal to the common voltage according to an exemplary embodiment of the present inventive concept.

FIG. 7 is a cross-sectional view illustrating the display panel of FIG. 1 along a line II-II' of FIG. 3 according to an exemplary embodiment of the present inventive concept. FIG. 8 is a diagram illustrating movement of impurities when pixels of the display panel of FIG. 1 that are disposed in a second direction represent the black grayscale and the shield voltage is equal to the common voltage. FIG. 9 is a diagram illustrating movement of impurities when the pixels of the display panel of FIG. 1 that are disposed in the second direction represent the black grayscale and the shield voltage is not equal to the common voltage according to an exemplary embodiment of the present inventive concept.

Referring to FIGS. 1 to 9, the first substrate includes the pixel electrodes P11 to P46 and the shield electrode SCE disposed between pixel electrodes P11 to P46. The shield voltage VSCOM is applied to the shield electrode SCE.

As described above, the second substrate faces the first substrate. The second substrate includes the common electrode VCE to which the common voltage VCOM is applied.

For example, the display panel 100 includes the plurality of pixel rows and the plurality of pixel columns.

Referring to FIG. 7, the first pixel electrode P11 and the seventh pixel electrode P21 disposed along the second direction D2 are spaced apart from each other. A sixth shield electrode portion SCEH1 of the shield electrode SCE is disposed between the first pixel electrode P11 and the seventh pixel electrode P21. The sixth shield electrode portion SCEH1 may be spaced apart from the first pixel electrode P11. The sixth shield electrode portion SCEH1 may be spaced apart from the seventh pixel electrode P21.

The seventh pixel electrode P21 and the thirteenth pixel electrode P31 disposed along the second direction D2 are spaced apart from each other. A seventh shield electrode portion SCEH2 of the shield electrode SCE is disposed between the seventh pixel electrode P21 and the thirteenth pixel electrode P31. The seventh shield electrode portion SCEH2 may be spaced apart from the seventh pixel electrode P21. The seventh shield electrode portion SCEH2 may be spaced apart from the thirteenth pixel electrode P31. The seventh shield electrode portion SCEH2 may be connected to the sixth shield electrode portion SCEH1 as shown in FIG. 3.

A configuration of an eighth shield electrode portion SCEH3 of the shield electrode SCE with respect to the thirteenth pixel electrode P31 and the nineteenth pixel electrode P41 may be substantially the same as that described above regarding the seventh shield electrode SCEH2 with respect to the seventh pixel electrode P21 and the thirteenth pixel electrode P31.

FIG. 8 represents an example in which the common voltage VCOM applied to the common electrode VCE is equal to the shield voltage VSCOM applied to the shield electrode SCE. In FIG. 8, the kickback voltage may increase from the first pixel electrode P11 to the nineteenth pixel electrode P41. In addition, in FIG. 8, the first pixel electrode P11 and the thirteenth pixel electrode P31 may have pixel voltages of the positive polarity, and the seventh pixel electrode P21 and the nineteenth pixel electrode P41 may have pixel voltages of the negative polarity. The first, seventh, thirteenth, and nineteenth pixel electrodes P11 to P41 may represent a black image. In addition, the moving direction of the impurities may be from the first pixel P11 to the nineteenth pixel P41 along the second direction D2. For example, the impurities may have the positive polarity.

In FIG. 8, the common voltage VCOM may be about 5.4V and the shield voltage VSCOM may be about 5.4V, substantially equal to the common voltage VCOM. The first black voltage which is an ideal black grayscale voltage in the positive polarity may be about 6.1V. The second black voltage which is an ideal black grayscale voltage in the negative polarity may be about 4.6V. The black gap BG, which may be the difference between the first black voltage and the second black voltage, may be about 1.5V.

In FIG. 8, when the first to nineteenth pixel electrodes P11 to P41 represent the black image, for the first pixel electrode P11 and the thirteenth pixel electrode P31 that have the positive polarity with respect to the common voltage VCOM, the pixel voltages decrease as the kickback voltage increases, and thus, the impurities in an area of the first pixel electrode P11 move quickly toward an area of the thirteenth pixel electrode P31. In addition, when the first to nineteenth pixel electrodes P11 to P41 represent the black image, for the seventh pixel electrode P21 and the nineteenth pixel electrode P41 that have the negative polarity with respect to the common voltage VCOM, the pixel voltages decrease as the kickback voltage increases, and thus, the impurities in an area of the seventh pixel electrode P21 move quickly toward an area of the nineteenth pixel electrode P41. The impurities may move to the pixel area disposed at the boundary portion of the black pattern and the white pattern.

Referring to FIG. 9, according to the present exemplary embodiment, the shield voltage VSCOM applied to the shield electrode SCE is not equal to the common voltage VCOM. As described above, the common voltage VCOM may be a DC voltage, and the shield voltage VSCOM may be a DC voltage.

When the black gap BG (e.g., 1.5V) is the difference between the first black voltage which is an ideal black grayscale voltage in the positive polarity (e.g., 6.1V) and the second black voltage which is an ideal black grayscale voltage in the negative polarity (e.g., 4.6V), the absolute value of the difference between the common voltage VCOM and the shield voltage VSCOM may be greater than or equal to half of the black gap BG (e.g., BG/2=0.75V). In FIG. 9, the absolute value of the difference between the common voltage VCOM and the shield voltage VSCOM is set to 1.5V (e.g., 5.4V−3.9V).

In the present exemplary embodiment, the shield voltage VSCOM may be less than or equal to VCOM-BG/2. For example, in this case, BG/2 may be about 0.75V. As shown in FIG. 9, the shield voltage VSCOM is less than the common voltage VCOM by about 1.5V. (The display panel 100 explained with reference to FIG. 6 may be the same as the display panel 100 explained with reference to FIG. 9 and thus the shield voltage VSCOM in FIG. 6 may be the same as the shield voltage VSCOM in FIG. 9.)

In FIG. 9, when the first to nineteenth pixel electrodes P11 to P41 represent the black image, for the first pixel electrode P11 and the thirteenth pixel electrode P31 that have the positive polarity with respect to the common voltage VCOM, the pixel voltages decrease as the kickback voltage increases. However, the impurities in an area of the first pixel electrode P11 are trapped at the sixth shield electrode portion SCEH1 disposed between the first pixel electrode P11 and the seventh pixel electrode P21 and the impurities in an area of the thirteenth pixel electrode P31 are trapped at the seventh shield electrode portion SCEH2 disposed between the thirteenth pixel electrode P31 and the nineteenth pixel electrode P41.

In addition, when the first to nineteenth pixel electrodes P11 to P41 represent the black image, for the seventh pixel electrode P21 and the nineteenth pixel electrode P41 that have the negative polarity with respect to the common voltage VCOM, the pixel voltages decrease as the kickback voltage increases. However, the impurities in an area of the seventh pixel electrode P21 are trapped at the sixth shield electrode portion SCEH1 disposed between the first pixel electrode P11 and the seventh pixel electrode P21 or at the shield seventh electrode portion SCEH2 disposed between the seventh pixel electrode P21 and the thirteenth pixel electrode P31.

Thus, the line afterimage generated due to the impurities collected at the boundary portion of the black pattern and the white pattern may be prevented.

According to the present exemplary embodiment, the line afterimage generated due to the impurities moving along the second direction D2 may be prevented by the shield electrode SCE disposed between the pixel electrodes (e.g., the first, seventh, thirteenth, and nineteenth pixel electrodes P11, P21, P31, and P41) disposed along the second direction D2. Thus, the display quality of the display panel 100 may be increased.

Although the shield electrode SCE includes both the first extending portion, extending in the first direction D1 and overlapping the gate lines GL, and the second extending portion, extending in the second direction D2 and overlapping the data lines DL, in the present exemplary embodiment, the present inventive concept is not limited thereto. Alternatively, the shield electrode SCE may include only the first extending portion extending in the first direction D1 and overlapping the gate lines GL. On the other hand, the shield electrode SCE may include only the second extending portion extending in the second direction D2 and overlapping the data lines DL.

As described above, in the display panel and the display apparatus including the display panel according to exemplary embodiments of the present inventive concept, the shield voltage is applied to the shield electrode disposed between the pixel electrodes so that the impurities in a pixel area are prevented from moving to another pixel area by the shield electrode to which the shield voltage is applied. Thus, the line afterimage at the boundary portion of the black pattern and the white pattern may be prevented. Therefore, the display quality of the display panel may be increased.

While the present inventive concept has been described with reference to exemplary embodiments thereof, it will be understood by those of ordinary skill in the art that various changes in form and details may be made thereto without departing from the spirit and scope of the present inventive concept as defined by the following claims.

What is claimed is:

1. A display panel including a display region and a peripheral region adjacent to the display region, the display pane comprising:
    a first substrate including a plurality of pixel electrodes and a shield electrode disposed between the pixel electrodes; and
    a second substrate facing the first substrate and including a common electrode,
    wherein the plurality of pixel electrodes is configured to receive pixel voltages,
    the shield electrode is configured to receive a shield voltage,
    the common electrode is configured to receive a common voltage,
    the shield electrode overlaps a data line included in the first substrate, and
    every portion of the shield electrode is disposed on a same layer as the plurality of pixel electrodes in the display region.

2. The display panel of claim 1, wherein the shield voltage is not equal to the common voltage.

3. The display panel of claim 2, wherein the common voltage and the shield voltage are direct current voltages.

4. The display panel of claim 3, wherein a first black voltage is a black grayscale voltage of a positive polarity, a second black voltage is a black grayscale voltage of a negative polarity, and a black gap (BG) is a difference between the first black voltage and the second black voltage, and
    an absolute value of a difference between the common voltage and the shield voltage is greater than or equal to BG/2.

5. The display panel of claim 4, wherein the common voltage is greater than the shield voltage.

6. The display panel of claim 1, wherein the shield electrode and the plurality of pixel electrodes are formed by the same metal layer.

7. The display panel of claim 1, wherein the shield electrode comprises:
    a first extending portion extending in a first direction;
    a second extending portion extending in a second direction crossing the first direction; and
    a crossing portion at which the first extending portion and the second extending portion cross.

8. The display panel of claim 7, wherein the first substrate comprises a gate line extending in the first direction and the data line extending in the second direction, and
    the first extending portion of the shield electrode overlaps the gate line.

9. The display panel of claim 7, wherein the first substrate comprises a gate line extending in the first direction and the data line extending in the second direction, and
    the second extending portion of the shield electrode overlaps the data line.

10. A display apparatus comprising:
    a display panel including a display region and a peripheral region adjacent to the display region and including a first substrate and a second substrate facing the first substrate, wherein the first substrate includes a plurality of pixel electrodes and a shield electrode disposed between the pixel electrodes, and the second substrate includes a common electrode;
    a gate driver configured to provide a gate signal to the display panel;
    a data driver configured to provide a data voltage to the display panel and apply pixel voltages to the plurality of pixel electrodes; and
    a common voltage generator configured to apply a common voltage to the common electrode and a shield voltage to the shield electrode,
    wherein every portion of the shield electrode is disposed on a same layer as the plurality of pixel electrodes in the display region.

11. The display apparatus of claim 10, wherein the shield electrode comprises:
    a first extending portion extending in a first direction;
    a second extending portion extending in a second direction crossing the first direction; and
    a crossing portion at which the first extending portion and the second extending portion cross.

12. The display apparatus of claim 11, wherein the first substrate comprises a gate line extending in the first direction and a data line extending in the second direction, and
    the first extending portion of the shield electrode overlaps the gate line.

13. The display apparatus of claim 11, wherein the first substrate comprises a gate line extending in the first direction and a data line extending in the second direction, and
    the second extending portion of the shield electrode overlaps the data line.

14. A method of operating a display panel comprising a first substrate and a second substrate, wherein the first substrate comprises plurality of pixel electrodes and a shield electrode disposed between each of the plurality of pixel electrodes and the second substrate comprises a common electrode, the method comprising:
    applying a shield voltage to the shield electrode; and
    applying a common voltage different from the shield voltage to the common electrode,
    wherein a first black voltage is a black grayscale voltage of a positive polarity, a second black voltage is a black grayscale voltage of a negative polarity, and a black gap (BG) is a difference between the first black voltage and the second black voltage, and
    an absolute value of a difference between the common voltage and the shield voltage is greater than or equal to BG/2.

15. The method of claim 14, wherein a plurality of pixel voltages is applied to the plurality of pixel electrodes, the pixel voltages alternate between a positive polarity with respect to the common voltage and a negative polarity with respect to the common voltage when applied to the pixel electrodes in a first direction, and the pixel voltages alternate between the positive polarity and the negative polarity when applied to the pixel electrodes in a second direction that is substantially perpendicular to the first direction.

16. The display apparatus of claim 10, wherein the common voltage is not equal to the shield voltage.

17. The display apparatus of claim 16, wherein the common voltage and the shield voltage are direct current voltages.

18. The display apparatus of claim 17, wherein a first black voltage is a black grayscale voltage of a positive polarity, a second black voltage is a black grayscale voltage of a negative polarity, and a black gap (BG) is a difference between the first black voltage and the second black voltage, and an absolute value of a difference between the common voltage and the shield voltage is greater than or equal to BG/2.

* * * * *